Oct. 25, 1938.    P. E. KÖSTER    2,134,132
METHOD AND SYSTEM FOR THE VERTICAL NAVIGATION OF BLIND LANDING AIRPLANES
Filed May 16, 1935
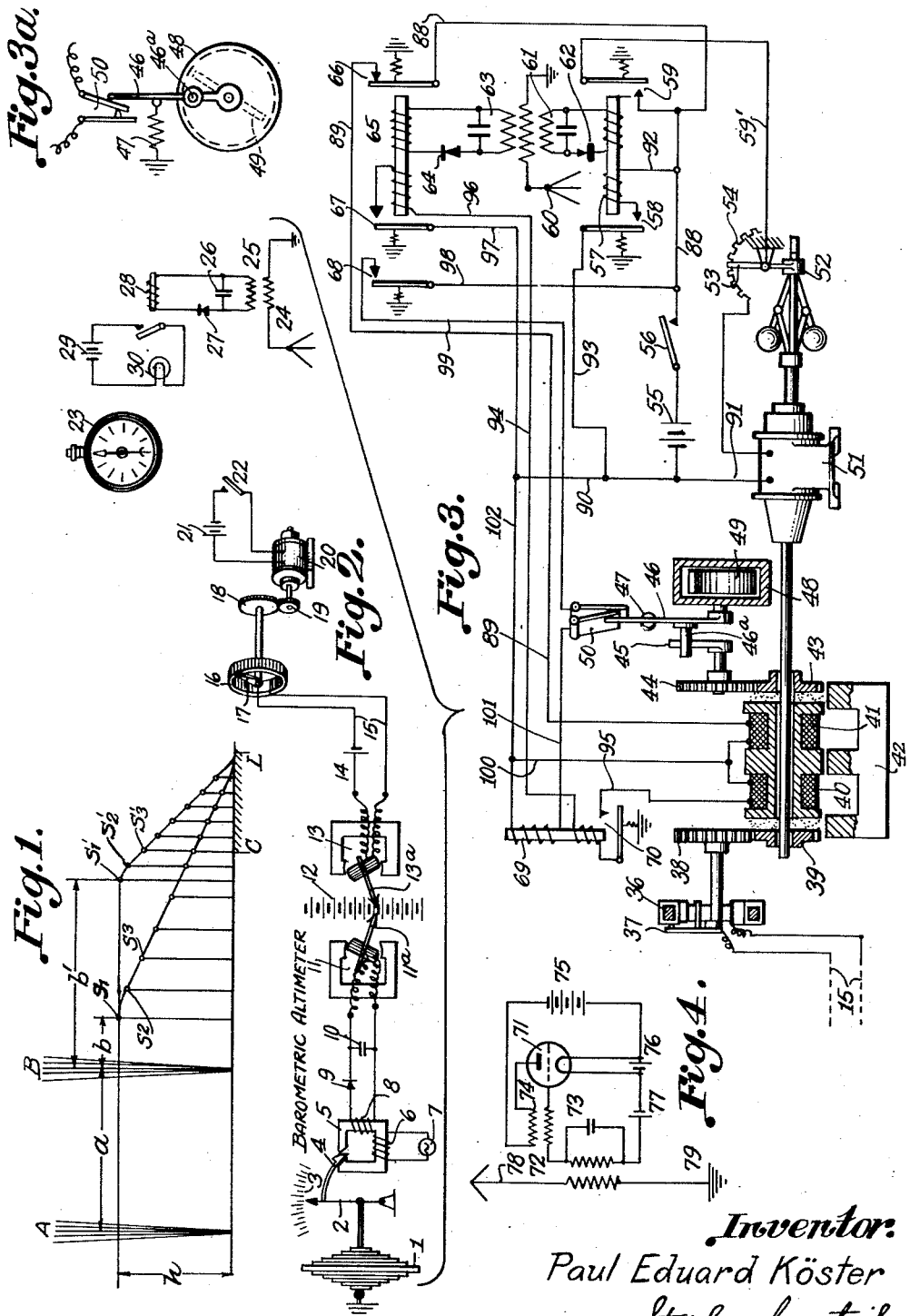
Inventor:
Paul Eduard Köster
By Stephen Gerstvik
Attorney.

Patented Oct. 25, 1938

2,134,132

UNITED STATES PATENT OFFICE

2,134,132

METHOD AND SYSTEM FOR THE VERTICAL NAVIGATION OF BLIND LANDING AIRPLANES

Paul Eduard Köster, Berlin-Siemensstadt, Germany, assignor to Siemens Apparate und Maschinen G. m. b. H., Berlin, Germany, a corporation of Germany Application May 16, 1935, Serial No. 21,791
In Germany May 19, 1934

9 Claims. (Cl. 177—352)

My invention relates to a method and a system for the vertical navigation of blind-landing airplanes.

The problem of blind landing of an airplane comprises two part-problems, viz., the fixing and the maintenance of a suitable horizontal and vertical landing direction. The first part-problem, i. e., the fixing and the maintenance of the horizontal landing direction presents relatively small difficulties and has already been solved in various ways.

The invention relates to the solution of the second part-problem, the so-called vertical navigation. It is well known in the art to place for the above purposes surfaces of constant intensity in the landing space with the aid of a short-wave transmitter and to use one of these surfaces as a gliding path for the airplane, the latter being so controlled when landing that an intensity measuring device arranged in the airplane always indicates the same intensity value corresponding to the gliding path in question. However, it is not possible to obtain with the curvature of such a gliding path the proper vertical landing curve. It has been, therefore, proposed in order to improve said vertical gliding path to use various of the above-mentioned intensity surfaces by indicating during the landing with the aid of a time mechanism successive different desired intensities so that the gliding path resulting therefrom utilizes or intersects various intensity surfaces. This as well as the first method requires as a rule during the landing, apart from the auxiliary devices necessary on the ground for the radiation of the intensity surfaces, both an operation of the elevator and a change of the driving gear power in order to maintain a predetermined vertical landing curve.

The object of the present invention is to provide a method and a system for vertical navigation, whereby not only the auxiliary devices necessary for the navigation are greatly simplified but also a predetermined vertical landing curve may in general be maintained by the operation of the elevator alone.

This may be accomplished according to the invention by the fact that the vertical landing curve is formed by a timely coordination of the heights to a point of reference, for instance, to the landing point and that the actual height of flight is measured from the airplane and that the distance between the point at which the landing curve must begin and the landing point is adapted to the magitude of the wind velocity.

For the maintenance of the vertical landing curve no use is made of a system arranged on the ground, but of an altimeter located in the airplane, after having at first determined a suitable landing curve by a timely coordination of the heights to a point of reference; for instance to the landing point. Consequently, the same vertical landing curve corresponding to the type of airplane in question may always be followed in accordance with the time. It is thereby possible to effect the landing by the operation of the elevator alone in the same manner as in the case of a landing under conditions of good visibility.

In the accompanying drawing embodiments of my invention are illustrated in diagrammatic form.

Fig. 1 shows a graphical illustration of the method according to the invention with two landing curves for two different wind velocities.

Fig. 2 shows an arrangement for the vertical navigation according to the invention with hand operation.

Fig. 3 illustrates an automatic arrangement for fixing the moment at which the landing glide must begin.

Fig. 3a is a detail face view of certain elements of Fig. 3.

Fig. 4 shows a circuit diagram of the transmitters for the radiation of the beams A and B of Fig. 1.

At A as shown in Fig. 1 an advance signal beam and at B the main signal beam are radiated as is usual in landing fields. The landing field begins at C. $s_1$—L and $s_1'$—L are two landing curves based on two different wind intensities. For other wind strengths other landing curves may be obtained when plotting them in accordance with the horizontal path. If, however, the curves $s_1$—L, $s_1'$—L etc. are plotted against time referred to the same moment, for instance to the moment at which the airplane lands at L, the curves coincide with one another at L, the points $s_1$ and $s_2$ etc. corresponding respectively to points $s_1'$ and $s_2'$ etc. The airplane heads towards the landing field at a height $h$ and begins to land at the points $s_1$ or $s_1'$ etc. depending on the force of the wind, the right-hand curve $s_1'$—L being for use in a stronger wind than the left-hand curve $s_1$—L.

The moment at which the landing is to commence after the airplane has passed the main signal B may be easily determined on the basis of the time taken by the airplane to fly the distance $a$ between the advance signal A and the main signal B.

The system shown in Fig. 2 may be employed for determining this time interval and maintaining the predetermined vertical landing curve.

In Fig. 2, 1 denotes an instrument for measuring the true height of the airplane, and which, for instance, operates on the barometric principle or which may be designed in a manner well known in the art as an electric or acoustic altimeter. The pointer 2 of this measuring instrument moves over a scale 3 and, besides, actuates through an amplifying device the pointer of an electric indicating instrument 11 which moves over a scale 12. To this end, the pointer 2 is associated with a magnetic segment of a suitable shape which upon the movements of the pointer 2 penetrates more or less into the air gap of a transformer 5, 6, 8, thus varying the magnetic resistance of the core 5. The transformer feeds a rectifier 9 with an alternating current supplied by a power source 7 and charges a condenser 10 through the rectifier 9, the condenser being discharged again through the electromagnetically operated indicating instrument 11. The above-described amplifier is so dimensioned that the position of the pointer in the measuring instrument 11 always corresponds to that of the pointer 2, that is to say it indicates the true height of the airplane. The pointer 13a of another, for instance also electromagnetically operated, indicating instrument 13 moves over the same scale 12, the instrument 13 being so adjusted according to the invention that it always indicates the required height at which the airplane should be if the desired landing curve (for instance s1—L in Fig. 1) is to be maintained. The pilot need only operate the elevator in such a manner that both pointers indicate the same mark on the scale 12 in order to keep the plane on the required course.

The movement required for the measuring instrument 13 is brought about in the following manner: The signals (advance and main signal) designated by A and B respectively are produced by wireless transmitters which have such a directional characteristic as to radiate only in the upward direction. The connection of these transmitting apparatus which may be the same for both is shown in Fig. 4. Each transmitter consists of a discharge tube 71 whose cathode is heated by a current supplied by the energy source 76 and whose anode current is supplied by the battery 75. In the grid circuit of the tube 71 lies an oscillatory circuit tuned to the transmitting frequency and consisting of a winding of the transformer 72 and the condenser 73 and which is, on the one hand, connected to the cathode through the battery 77 and, on the other hand, to the grid through a winding of a second transformer 74. The other winding of the second transformer is traversed by the anode current of the tube 71.

Such a back-coupled tube connection is as is well known capable of producing oscillations which are supplied through the secondary winding of the transformer 72 to an aerial circuit consisting of an aerial 78 directed upwardly and of an earth connection 79. Two such transmitters are, therefore, provided for the production of the signal beams A and B (Fig. 1).

On the airplane there is a receiving aerial circuit 25, 26 (Fig. 2) tuned to the transmitting frequency which supplies through a detector 27 energy absorbed by the aerial 24 to the relay 28 when the airplane flies over the beams A and B. Upon the operation of the relay 28 the circuit of a battery 29 is closed and a signal lamp 30 is thereby lighted up. By means of a stop watch 23 the pilot can determine the time taken by the airplane to fly from the transmitter A to the transmitter B, this time depending on the wind velocity and constituting the ground speed of the plane. As soon as the pilot has flown over the beam B he causes an additional time interval to elapse which depends upon the wind velocity (this time interval may be ascertained by the pilot from a graph or a table) and which time may be observed by means of a stop watch; whereupon he closes a circuit by means of a switch 22, thus supplying the motor 20 with energy from the source 21. The motor is put into operation and moves the sliding contact 17 of a variable resistance 16 through the gears 19, 18. The resistance is calibrated so that it varies according to the desired vertical landing curve in accordance with the angle of rotation of the sliding contact thereof, so that the resistance 16—after the insertion of the motor 20 in the circuit in accordance with time—represents according to a suitable scale the height to be maintained when flying along the desired vertical landing curve. In this case the scale depends according to the embodiment shown in Fig. 2 on the characteristic of the altimeter 1, i. e., the characteristic of the resistance 16 is so chosen that the pointer 13a always indicates the position to which the pointer of instrument 11 must be brought with the aid of the elevator in order that the airplane may follow the proper landing curve. Resistance 16 forms part of a circuit 15, including the current source 14 and the coil of pointer 13a of indicating instrument 13. After the landing is completed the pilot opens motor switch 22 and thus stops the further operation of pointer 13a.

The determination of the time at which the landing is to begin after the airplane has flown over the main signal B may also be effected automatically. This may be accomplished by employing the arrangement shown in Fig. 3. This figure discloses only the parts necessary for the proper variation of the current in the circuit 15; the indicating apparatus as well as the instrument for measuring the true height of the airplane (parts 1 to 14 of Fig. 2) have been omitted, since they are employed in the arrangement according to Fig. 3 in exactly the same manner as those in Fig. 2 employed for the non-automatic method. The resistance 36 (Fig. 3) corresponds to the resistance 16 (Fig. 2); its sliding contact 37 is actuated by the motor 51 through the gears 38, 39 in the following manner:

In the case of a full-automatic system it is necessary that the transmitters A and B radiate different waves, differently modulated or in any other manner so different from one another that their effects on the airplane receiver may be separately taken advantage of. For a better understanding of the present embodiment it is assumed that A and B emit different waves. These waves are absorbed by an aerial 60 arranged on the airplane. Two oscillatory circuits 61 and 63 are coupled to the aerial of which 61 is tuned to the wave length of A, 63 to the wave length of B. There is further provided an energy source 55 which at the beginning of the landing operation is ready to function as soon as the switch 56 has been closed. In this manner the electromagnetic coupling 41 which is secured to the shaft of the motor 51 is operated, since energy is supplied to the coupling by the battery 55 through the switch 56, wire 88, the resting contact 66 of the relay 65, and the wire 89, the current returning to the battery through the wires 100, 102, and 90. The supply circuit 55, 56, 88, 59, 59', 53, 54, 91 for the motor 51 is, however, still open at the contact 59 of the relay 57, so that the motor is not running.

As soon as the airplane flies over the transmitter A the aerial 60 will absorb energy which is supplied to the detector 62 through the circuit 61 tuned to the transmitting frequency and after rectification operates the relay 57. The relay closes its two operating contacts 58 and 59 and the contact 58 closes a holding circuit 55, 56, 88, 92, 58, 93 and causes in this manner the relay to remain energized even after the supply of the energy absorbed by the aerial has ceased. The contact 59 closes the above mentioned supply circuit 55, 56, 88, 59, 59', 53, 54, 91 for the motor 51, so that the latter is operated and adjusts itself to a predetermined speed by means of a centrifugal governor 52 which varies a resistance 54 in the supply circuit with the aid of a sliding contact 53. Since the coupling 41 is energized, the slidably mounted gear 43 revolves and drives the gear 44. A driver 45 is secured to the shaft of the gear 44 and is in operative connection with a pin 46a on a lever 46 which in turn is connected to the rotatably mounted part 49 of a damping device 48. A spring 47 tends to bring the lever 46 into the position shown in which it closes the contact 50, which lies in the exciting circuit 55, 56, 98, 68, 99, 50, 101, 102, 90 of another relay 69.

The motor 51, the energizing circuit of which is closed at the moment the airplane passes over the transmitter A, actuates the lever 46 in a direction opposite to the action of the spring 47 by means of the gears 43, 44, 45 until the airplane passes over the transmitter B. At this moment the receiving circuit 63 tuned to the length of the waves emitted by the transmitter B absorbs energy from the antenna 60 and actuates the relay 65 after rectification effected by the detector 64. The relay 65 opens its resting contact 66, thereby interrupting the exciting circuit for 55, 56, 88, 66, 89, 90 of the coupling 41 thus causing the gears 43, 44, 45 and, therefore, the lever 46 to come to rest. The contact 67 of the relay 65 at the same time closes the holding circuit 55, 56, 96, 67, 97, 90 of said relay. At the same time a further working contact 68 of the relay 65 is closed. The lever 46 is now brought back by the spring 47 to its position of rest, the movement being retarded by the damping device 48. Since the extent of the deflection of the lever 46 depends on the time which the airplane takes to fly from the transmitter A to the transmitter B, the time which the lever takes to return to its original position likewise depends thereon.

When the lever 46 comes to its position of rest it actuates the contact 50 which completes the above-mentioned circuit extending from the energy source 55 through the switch 56, wire 98, the closed operating contact 68 of the energized relay 65, wire 99, contact 50, wire 101, the winding of the relay 69, and wires 102, 90, thus causing the said relay 69 to be actuated. The relay 69 through its contact 70 closes the exciting circuit 55, 56, 97, 67, 94, 69, 70, 95, 40, 100, 102, 90 for the electromagnetic coupling 40 through the operating contact 70 thereof and at the same time maintains its own energization. The coupling 40 brings about an operative connection between the gears 39, 38 and the shaft of the motor 51 revolving always at a constant speed, thereby causing a movement of the sliding contact 37 of the resistance 36 secured to the end of the shaft of the gear 38. The resistance as above described is so dimensioned that an indicating instrument (13 in Fig. 2) lying in series therewith always indicates the desired height.

A magnetic yoke 42 insures that upon the energization of the coils 40 or 41 only one of the couplings will be actuated. After the landing of the airplane the entire arrangement is again brought out of operation by opening the switch 56 in a manner similar to opening of switch 22 in Fig. 2.

In Fig. 5 I have illustrated an apparatus in which my invention is combined with an automatic altitude control. For the sake of simplifying the drawing, Fig. 5 omits most of the apparatus described with reference to Figs. 1 to 4, and shows only the last members of said apparatus, viz.: the indicating instruments or devices 11 and 13. The following automatic control system is connected with said devices: The elevator 110 is adapted to be operated from the actuating piston 113 through the rod 112 and the lever 111. The piston 113 is movable in a cylinder 114 adapted to receive a medium under pressure, for instance oil, through either of the conduits 115, 116. The admission of such oil to one end of the cylinder or the other is controlled by the slide valve or piston 117 the position of which is governed by a rotary relay magnet 118. The valve 117 has two heads movable in the control cylinder 119. The field coil of magnet 118 is connected with a source of electricity 124 by means of wires 135 and 136. The fluid under pressure is admitted through a conduit 120 to the central portion of the cylinder 119, while conduits 121 for the discharge of said fluid are connected with the end portions of said cylinder. The movable or armature coil of the magnet 118 is connected in a diagonal branch of an electric bridge circuit formed by the resistances 122 and 123. The source of electricity 124 lies in the other diagonal branch of said circuit. The resistance 123 is tapped at the proper point to supply the right voltage to the magnet 118, by means of a switch arm 125 pivoted at 126 and carrying a brush or other contact member to sweep over the resistance 123. A pin-and-slot connection 127 causes the switch arm 125 to swing on its pivot whenever the rod 112 moves. The arm 125 is connected by a wire 126' with one terminal of the armature coil of the magnet 118. The other terminal of said coil is connected by a wire 118' with a contact roller or trolley 128 journaled on a carrier 129 and engaging a resistance 122 connected with the wires 135, 136. The carrier 129 and the carrier of the resistance 122 are mounted for sliding movement in suitable guides, so that the position of the contact roll 128 relatively to the resistance 122 may be altered. Compression springs 133, 134 are interposed between the lower ends of said carriers and a stationary backing, to compensate for the weight of the carriers and enable them to move more readily. The upper ends of the carriers are connected by links 130, 131 with the movable members of indicating devices 13 and 11 respectively. Any movement of one or the other of said members will therefore cause a corresponding shifting of the contact roll 128 or the resistance 122 respectively.

The apparatus illustrated by Fig. 5 operates as follows: The indicating instrument 13 indicates the altitude to be attained in order to obtain a predetermined landing curve, while the instrument 11 indicates the actual altitude of the airplane. If there is agreement between these two altitudes, that is, if the airplane is flying at the correct altitude, the contact roll 128 will be at the center of the resistance 122. At the same time the piston 113 will be in its central position, and the contact portion of the switch arm 125 will be at the central point of the resistance 123. The points 126 and 128, between which the magnet 118 is connected, have the same potential, so that no current will flow through the movable coil of the magnet and the latter will remain stationary. Let us now assume that the airplane is flying at too great an altitude. As a result, the elements 122 and 128 will move relatively to each other so as to bring the contact roll 128 above the center of the resistance 122. Accordingly, there will be a potential difference between the points 126 and 128, and as a result thereof, current will flow through the movable coil of the magnet 118, causing said coil to swing and to shift the piston valve 117 to the left, through the pin-and-slot connection 117' and the piston rod 117". This movement of the valve 117 will connect the admission pipe 120 with the conduit 115. The actuating piston 113 will thus be forced toward the right, causing the elevator 110 to be depressed, which corresponds to a downward movement of the airplane. At the same time the switch arm 125 will be swung toward the right. During such movement, the contact portion of the arm 125 will at a certain moment reach a point of the resistance 123 which has the same potential as that point of the resistance 122 which at that moment is engaged by the contact roll 128. At this moment the flow of current through the movable coil of the magnet will cease, and springs 132 will bring said movable coil and the piston valve 117 back to their original positions, the piston or servomotor 113 thus becoming stationary. The resistance 123 together with the switch arm 125 therefore constitutes an electrical follow-up device for the servomotor.

When with the aid of the elevator adjustment thus effected the airplane has reached the desired altitude, the contact roll 128 will travel back to the central point of the resistance 122 and thus cause the elevator to swing back, in view of the fact that current will then be flowing in the opposite direction through the movable coil of the magnet 118, causing the piston valve 117 to move toward the right.

The reverse operations will take place if the airplane is flying at too low an altitude. In this case, the contact roll 128 will travel along the lower half of the resistance and will cause the piston valve 117 to be shifted toward the right, so that the servomotor 113 will move toward the left and cause the elevator 110 to be swung upwardly on its fulcrum.

It will be understood to be immaterial whether the indicating instruments 11 and 13 of Fig. 5 are connected with a manually operated apparatus of the type shown in Fig. 2, or with an automatic apparatus of the type shown in Fig. 3.

It is to be understood that the time measuring device consisting according to Fig. 3 of the motor 51 and the parts 44 to 50 for determining the point at which the landing glide must begin may, of course, also be replaced by any other automatically operating time measuring device.

I claim as my invention:

1. In a control system for vertically navigating a blind landing aircraft along a predetermined path, said system being operable in conjunction with two spaced, vertically directed, radio beams, the combination of radio controlled means for measuring the time of flight of said aircraft between said beams, means operable in accordance with the measurement taken by said first-named means for determining the instant at which the descent of said aircraft should begin after passing the second of said beams, means adapted to be set into operation by said last-named means for progressively indicating, during the descent of said aircraft, the altitude of said landing path at the intersection of the latter with a vertical line passing through the aircraft, and means for continuously indicating the altitude of the aircraft whereby the operative may manipulate the control surfaces of the aircraft to coordinate said altitude indications and thereby maintain the aircraft on said landing path.

2. In a control system for vertically navigating a blind landing aircraft along a predetermined path, said system being operable in conjunction with two spaced, vertically directed, radio beams, the combination of radio controlled means for measuring the time of flight of said aircraft between said beams, means operable in accordance with the measurement taken by said first-named means for determining the instant at which the descent of said aircraft should begin after passing the second of said beams, means adapted to be set into operation by said last-named means for progressively indicating, during the descent of said aircraft, the altitude of said landing path at the desired position of the aircraft thereon, and means for indicating the altitude of the aircraft.

3. In a control system for vertically navigating a blind landing aircraft along a predetermined landing path, said system being operable in conjunction with two spaced, vertically directed radio beams, the combination of radio controlled means for measuring the time of flight of said aircraft between said beams, said means including an element adapted to be moved a distance proportional to said time of flight, means for controlling the return movement of said element, means rendered operable by said element when the latter returns to its initial position for progressively indicating the altitude of said landing path at the desired position of the aircraft thereon, and means for continuously indicating the altitude of the aircraft whereby the operator may manipulate the control surfaces of the aircraft to coordinate said altitude indications and thereby maintain the aircraft on said landing path.

4. In a control system for vertically navigating a blind landing aircraft along a predetermined landing path, means for determining the ground speed of the aircraft, means for determining when the aircraft passes over a point a predetermined distance from the point of landing, means controlled by said last-named means for determining the point of initial descent of the aircraft along said landing path in accordance with said ground speed, means for progressively determining the altitude of said path at the desired position of the aircraft thereon, and means for determining the altitude of the aircraft.

5. In a control system for vertically navigating a blind landing aircraft along a predetermined landing path, radio controlled means for determining the ground speed of the aircraft, means for determining the point of initial descent of the aircraft along said path in accordance with said ground speed, and means operative after the aircraft reaches said point of initial descent for progressively determining the altitude of said path at the desired position of the aircraft thereon, and means for determining the altitude of the aircraft.

6. In a control system for vertically navigating a blind landing aircraft along a predetermined landing path, said system being operable in conjunction with two spaced, vertically directed radio beams, the combination of radio controlled means for measuring the time of flight of said aircraft between said beams, said means including an element movable from a starting position a distance proportional to said time of flight, means for returning said element to its starting position, means for controlling the return movement of said element, means rendered operable when said element returns to said starting position for progressively indicating the altitude of said landing path at the desired position of the aircraft thereon, said last-named means including an electric circuit, a source of electric energy and a resistance in said circuit, means for progressively varying said resistance and an indicator operable in accordance with the current flow in said circuit, and means for continuously indicating the altitude of the aircraft, whereby the operator may manipulate the control surfaces of the aircraft to coordinate said altitude indications and thereby maintain the aircraft on said landing path.

7. In a control system for vertically navigating a blind landing aircraft along a predetermined landing path, means for determining the ground speed of the aircraft, means for determining when said aircraft passes over a predetermined point adjacent the landing field, means controlled by said last-named means for determining, in accordance with said ground speed, the required time of flight between said point and the starting point of said landing path, means controlled by said time determining means for progressively indicating the altitude of said path at the desired position of the aircraft thereon, and means for indicating the altitude of the aircraft.

8. Method for blind landing an aircraft along a predetermined landing path which includes the steps of ascertaining the flying time for level flight of the aircraft over a predetermined linear course, maintaining the aircraft on its line of flight, starting the aircraft on its descent along said landing path a predetermined interval after leaving said course, said interval being dependent upon said ascertained flying time, indicating progressively during the descent of said aircraft the altitude of said landing path at the intersection of the latter and a vertical line passing through the aircraft, indicating the altitude of the aircraft, and manipulating the aircraft control surfaces to coordinate said altitude indications.

9. In a method for blind landing an aircraft along a predetermined landing path, the steps which include ascertaining the ground speed of the aircraft, determining when the aircraft passes over a predetermined point adjacent the landing field, starting the aircraft on its descent along said landing path at a predetermined interval after passing over said point, said interval being dependent upon said ascertained ground speed, progressively determining the altitude of said landing path at the desired position of the aircraft along said path, and maintaining the aircraft at said determined altitude.

PAUL EDUARD KÖSTER.